United States Patent
Govindu et al.

(10) Patent No.: US 11,139,765 B1
(45) Date of Patent: Oct. 5, 2021

(54) DYNAMIC DECOUPLING CONTROL WITH ACTIVE NOISE CANCELLATION

(71) Applicant: STEERING SOLUTIONS IP HOLDING CORPORATION, Saginaw, MI (US)

(72) Inventors: Varsha Govindu, Ann Arbor, MI (US); Julie A. Kleinau, Bay City, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/877,095

(22) Filed: May 18, 2020

(51) Int. Cl.
| | |
|---|---|
| *H02P 21/00* | (2016.01) |
| *H02P 21/05* | (2006.01) |
| *B62D 5/04* | (2006.01) |
| *H02P 21/22* | (2016.01) |
| *H02P 21/13* | (2006.01) |

(52) U.S. Cl.
CPC .............. *H02P 21/05* (2013.01); *B62D 5/046* (2013.01); *H02P 21/13* (2013.01); *H02P 21/22* (2016.02)

(58) Field of Classification Search
CPC .......... H02P 21/05; H02P 21/22; H02P 21/13; B62D 5/046
USPC ..................................................... 318/400.02
See application file for complete search history.

(56) References Cited

U.S. PATENT DOCUMENTS

| | | | | |
|---|---|---|---|---|
| 2005/0264255 | A1* | 12/2005 | Maruyama ............... | H02P 21/09 318/808 |
| 2011/0031907 | A1* | 2/2011 | Takahashi ............... | H02P 21/28 318/139 |
| 2013/0328508 | A1* | 12/2013 | Bae ..................... | H02P 21/0085 318/400.02 |
| 2021/0006189 | A1* | 1/2021 | Endo ...................... | H02P 21/22 |

OTHER PUBLICATIONS

U.S. Appl. No. 14/503,841, filed Oct. 1, 2014.
U.S. Appl. No. 15/006,901, filed Jan. 26, 2016.

* cited by examiner

*Primary Examiner* — Erick D Glass
(74) *Attorney, Agent, or Firm* — Dickinson Wright PLLC (57) ABSTRACT

A method of controlling a motor that generates an output current from an input voltage command. The method receives, from the motor, the output current that includes a direct-axis portion and a quadrature-axis portion, the output current being received as feedback current. The method determines a compensated voltage command by applying, to the feedback current, first gain factors and an inverse of second gain factors. The first gain factors decouple the d-axis portion and the q-axis portion of the compensated voltage command. The inverse of the second gain factors allow the compensated voltage command to be filtered in a manner that preserves decoupling between the d-axis and q-axis. The method determines the input voltage command for the motor by applying the second gain factors to the compensated voltage command to cause the motor to generate the output current with reduced influence of variations of operating parameters of the motor.

20 Claims, 8 Drawing Sheets

DYNAMIC DECOUPLING CONTROL WITH ACTIVE NOISE CANCELLATION

BACKGROUND OF THE INVENTION

An output torque of a permanent magnet synchronous motor (PMSM) (e.g., a surface permanent magnet (SPM), an interior permanent magnet (IPM) motor, and the like) may be determined by a voltage command and a phase advance angle. For example, an output torque of the PMSM may be determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

Electric Power Steering (EPS) systems use an electric motor (e.g., PMSM) to provide steering assist. When using a PMSM, Field Oriented Control (FOC) is utilized, which allows an alternating current (AC) poly-phase (e.g., three-phase) motor voltage and current signals to be transformed into a synchronously rotating reference frame, commonly referred to as the d-axis/q-axis reference frame, where the motor voltages and currents become direct current (DC) quantities. The FOC torque control technique is implemented either using feed forward methods of control or a closed loop current feedback control, or some combination of them.

SUMMARY OF THE INVENTION

An aspect of the disclosed embodiments includes a motor control system that generates an output current from an input voltage command. The motor control system includes at least one processor and a memory including instructions that, when executed by the at least one processor, cause the at least one processor to: receive, from a motor, the output current that includes a direct-axis (d-axis) portion and a quadrature-axis (q-axis) portion, the output current being received as feedback current. The at least one processor is further configured to determine a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis and q-axis portions of the compensated voltage command. The at least one processor is further configured to determine the input voltage command for the motor by applying the second set of gain factors to the compensated voltage command to cause the motor to generate the output current with reduced influence of variations of a set of operating parameters of the motor.

Another aspect of the disclosed embodiments includes a method of controlling a motor that generates an output current from an input voltage command. The method includes receiving, from a motor, the output current that includes a direct-axis (d-axis) portion and a quadrature-axis (q-axis) portion, the output current being received as feedback current. The method further includes determining a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis and q-axis portions of the compensated voltage command. The method further includes determining the input voltage command for the motor by applying the second set of gain factors to the compensated voltage command to cause the motor to generate the output current with reduced influence of variations of a set of operating parameters of the motor.

An aspect of the disclosed embodiments includes an electronic power steering (EPS) system. The EPS system includes a processor and a memory. The memory includes instructions that, when executed by the processor, cause the processor to receive, from a motor, the output current that includes a direct-axis (d-axis) portion and a quadrature-axis (q-axis) portion, the output current being received as feedback current. The instructions, when executed by the processor, further cause the processor to determine a d-axis portion of a voltage command and a q-axis portion of the voltage command by applying a set of gain factors to the feedback current. The instructions, when executed by the processor, further cause the processor to determine a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis and q-axis portions of the compensated voltage command. The instructions, when executed by the processor, further cause the processor to determine the input voltage command for the motor by applying the second set of gain factors to the compensated voltage command to cause the motor to generate the output current with reduced influence of variations of a set of operating parameters of the motor.

These and other advantages and features will become more apparent from the following description taken in conjunction with the drawings.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment.

An output torque of a permanent magnet synchronous motor (PMSM) (a surface permanent magnet (SPM), an interior permanent magnet (IPM) motor, etc.) may be determined by a voltage command and a phase advance angle. For example, an output torque of the PMSM may be determined by first selecting a specific q-axis reference current and a d-axis reference current, and then determining the voltage command and the phase advance angle based on the selected q-axis reference current and the d-axis reference current.

Electric Power Steering (EPS) systems use an electric motor (e.g., PMSM) to provide steering assist. When using a PMSM, Field Oriented Control (FOC) is utilized, which allows an alternating current (AC) poly-phase (e.g., three-phase) motor voltage and current signals to be transformed into a synchronously rotating reference frame, commonly referred to as the d-axis/q-axis reference frame, where the motor voltages and currents become direct current (DC) quantities. The FOC torque control technique is implemented either using feed forward methods of control or a closed loop current feedback control, or some combination of them.

Application of closed loop current control of PMSM to EPS systems has unique and demanding requirements outside of the control system's capability to track the desired assist torque command (i.e., motor torque command). Many of these requirements are associated with a balance of the torque response behavior, motor input disturbance characteristics, current measurement noise transmission characteristics, and robustness to the accuracy of the estimated electric motor parameter estimates. Consistency of performance throughout the operating range of the control system is desired, including operation throughout the motor velocity range and operation near the supply voltage limit. Unlike high voltage power applications utilizing PMSMs, the supply voltage available for the control system from a vehicle is not unlimited, and the motor used in these applications is typically sized as efficiently as possible to deliver steady state power requirements. This requires the current control to operate in a stable and predictable manner as the transient voltage available to the control system becomes smaller near the peak power point of PMSM operation. Therefore, the control system should be configured to operate as desired while requiring relatively small motor (input) voltage command transients.

In some situations, achievement of consistent high performance is attempted by implementing a model in the control system to decouple the d-axis voltage and the q-axis voltage. Decoupling the d-axis voltage and the q-axis voltage eliminates the influence of variations of the d-axis terms (e.g., d-axis inductance, d-axis current, etc.) on the q-axis voltage command and eliminates the influence of variations of the q-axis terms (e.g., q-axis inductance, q-axis current, etc.) on the d-axis voltage command. This allows the q-axis current and the d-axis current to be controlled independently of each other.

Additionally, stringent noise, vibration, and harness (NVH) requirements may be imposed on motor drive applications (e.g., such as applications within an EPS system). To address this, some electric motor drive applications use filtering techniques to attenuate undesired noise bands in different signal paths. For example, noise in a path of commanded currents and/or measured currents can be attenuated by applying filtering techniques to specific signal paths.

However, applying filtering techniques to voltage commands couples or re-couples the d-axis and q-axis portion of the voltage command. The coupling or re-coupling causes NVH-related disturbances to negatively influence the voltage command that the motor uses to determine output current.

Accordingly, systems and methods (e.g., such as those described herein), that filter NVH-related disturbances while preserving decoupling of the d-axis portion and q-axis portion of the voltage command, may be desirable. In some embodiments, the systems and methods described herein may be configured to control an output current from an input voltage command by filtering NVH-related disturbances using a transfer matrix and by implementing an inverse transfer matrix in a state feedback loop of a control system in order to preserve decoupling of the d-axis and q-axis portions of the voltage command. The systems and methods described herein may be configured to filter the input voltage command provided to the motor without removing the decoupling of the d-axis and q-axis portions of the voltage command. The systems and methods described herein may be configured to eliminate an influence that NVH-related disturbances have on operating parameters of the motor, such that the motor is able to achieve consistent high performance.

Figure 1:
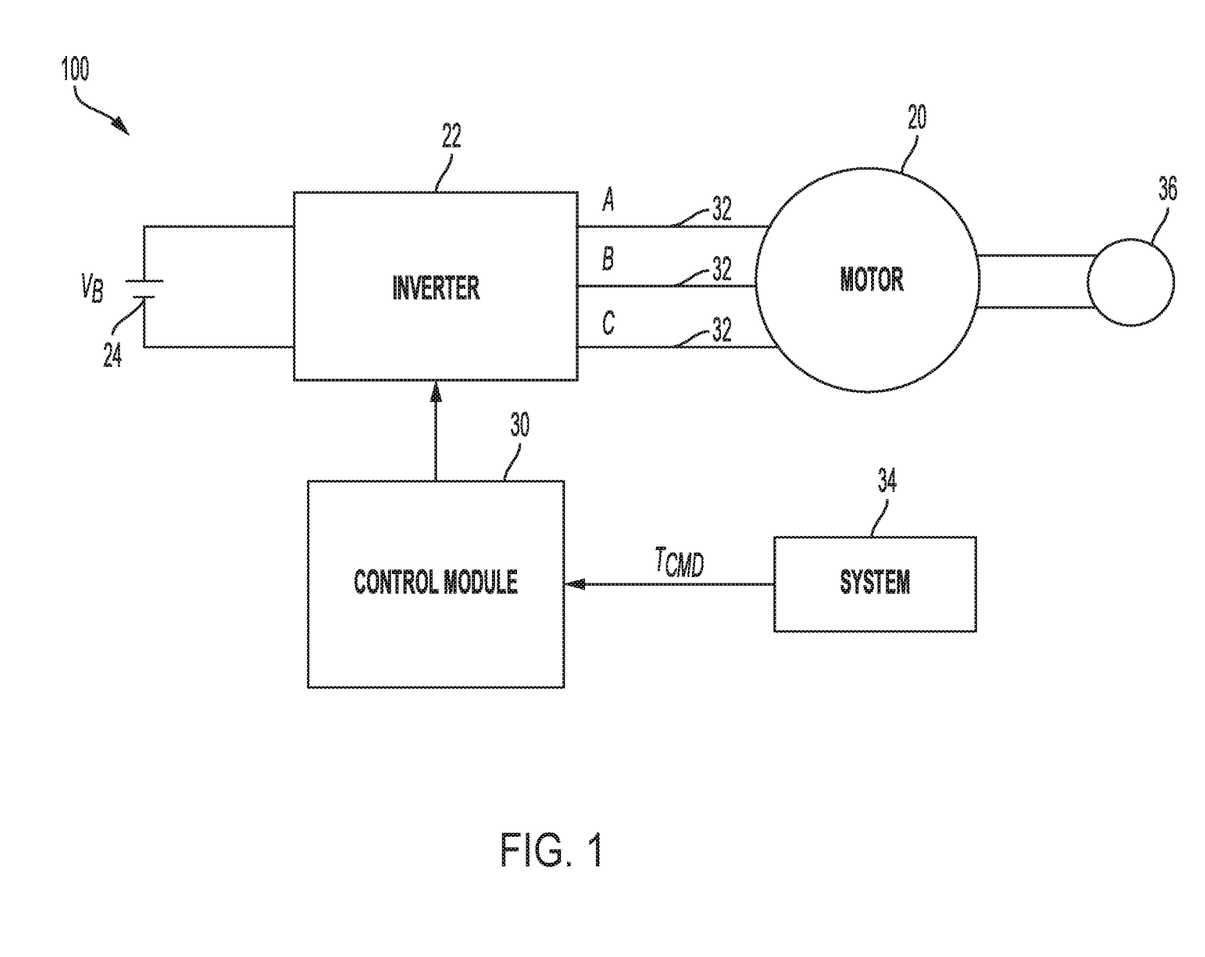
FIG. 1 generally illustrates a schematic of a motor control system according to the principles of the present disclosure.

FIG. 1 illustrates a control system 100 according to the principles of the present disclosure. As shown, the motor control system 100 includes a motor 20, an inverter 22, a supply voltage 24, and a control module 30 (also referred to as a controller). The voltage supply 24 supplies a supply voltage $V_B$ to the motor 20. In some embodiments, the voltage supply 24 is a 12 volt battery. However, it is to be understood that other types of voltage supplies may be used as well. The inverter 22 is connected to the motor 20 by a plurality of connections 32 (e.g., three connectors) that are labeled as 'A', 'B' and 'C'. In some embodiments, the motor 20 is a poly-phase, permanent magnet (PM) brushless motor. In this example, the motor 20 is a three-phase PM motor. The control module 30 is connected to the motor 20 through the inverter 22. The control module 30 receives a motor torque command $T_{CMD}$ from a source 34 such as, for example, a steering control system. The control module 30 includes control logic for sending an input voltage command $V_M$ to the motor 20 through the inverter 22.

Figure 2:
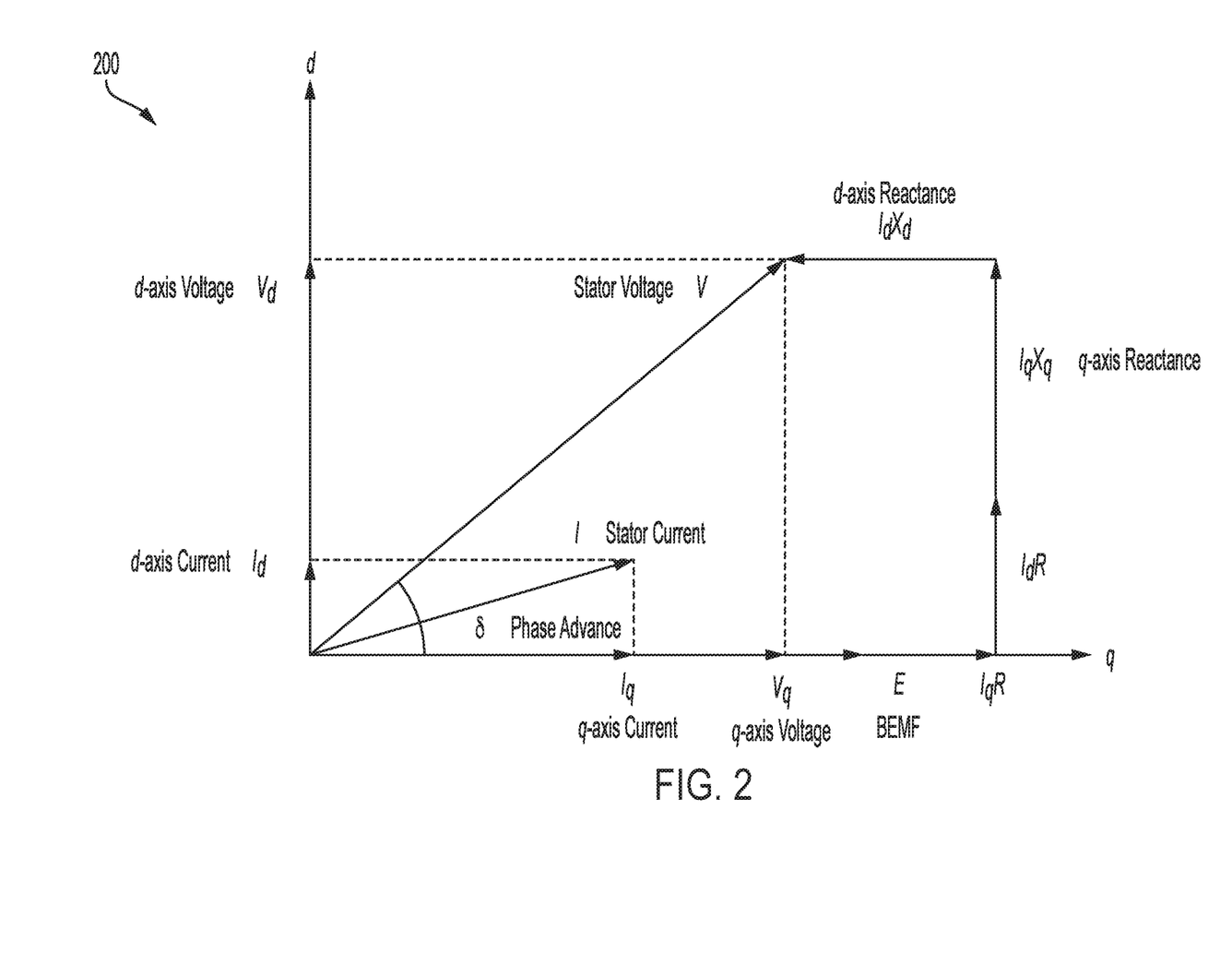
FIG. 2 generally illustrates a phasor diagram of a motor according to the principles of the present disclosure.

Referring now to FIGS. 1 and 2, the motor 20 is operated such that a phase of the input voltage command $V_M$ shifts with respect to a phase of a developed back electromotive force (BEMF) voltage $E_g$ of the motor 20. A phasor diagram of the motor 20 is shown in FIG. 2 and illustrates a voltage vector V having a magnitude that is the input voltage command $V_M$. A BEMF voltage vector E has a magnitude that is the BEMF voltage $E_g$. An angle between voltage vector V and the BEMF voltage vector E is defined and is referred to as a phase advance angle δ. A stator phase current is referred to as I, a stator phase current in the quadrature axis (q-axis) is referred to as $I_q$, a stator phase current in the direct axis (d-axis) is referred to as $I_d$, a stator phase reactance in the respective d-axis is referred to as $X_d$, the stator phase reactance in the q-axis is referred to as $X_q$, and a stator phase resistance of phase A or B or C is referred to as R.

In some embodiments, an encoder 36 (shown in FIG. 1) is used to measure an angular position θ of a rotor (not shown in FIG. 1) of the motor 20. The angular position θ of the motor 20 is used to determine the input phase voltages $V_a$, $V_b$ and $V_c$, where input phase voltage $V_a$ corresponds with connection A, input phase voltage $V_b$ corresponds with connection B, and input phase voltage $V_c$ corresponds with connection C. In some embodiments, the control module may include logic to determine duty cycles for respective phase legs of the inverter 22. For example, the duty cycles may be used to apply sinusoidal voltages at the motor 20 terminals, and may be determined using any known pulse width modulation (PWM) technique such as a sine PWM technique, a space vector PWM technique (e.g., continuous, discontinuous, etc.), a technique using harmonic injection, and/or the like. In some embodiments, the duty cycles may be converted into on-times based on the switching or PWM period and may be sent to a gate driver that applies gate signals to respective switches of the inverter 22.

The motor 20 rotates in a clockwise as well as a counterclockwise direction, and may also generate torque in both the clockwise and counterclockwise direction during operation.

Figure 3A:
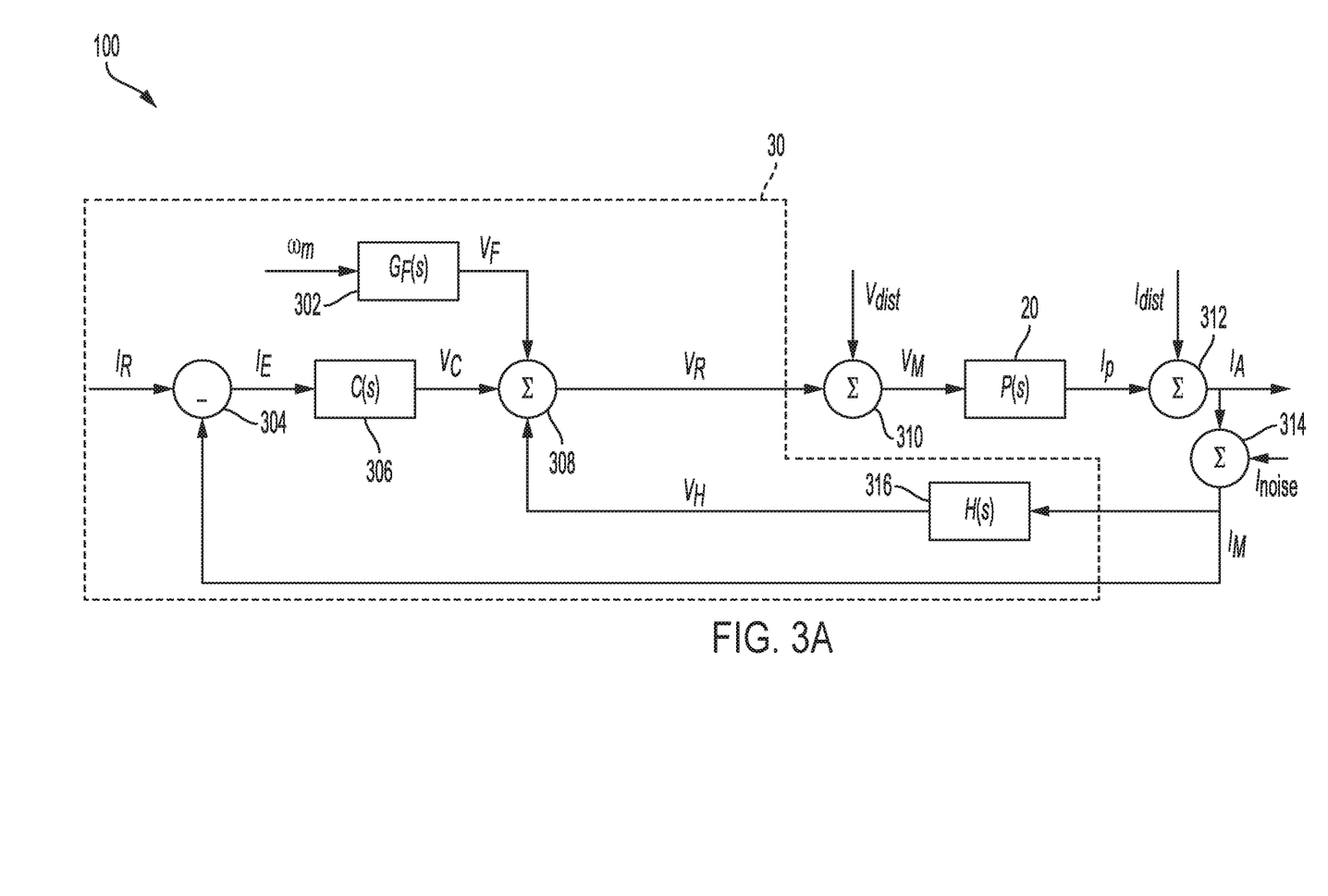
FIGS. 3A and 3B generally illustrate a block diagram of a control system using one or more modules for noise cancellation, according to the principles of the present disclosure.

FIG. 3A generally illustrates a block diagram of the control system 100 using one or more modules, according to the principles of the present disclosure. The control module 30 may include a BEMF compensation module 302, a subtraction module 304, a compensation and integration module 306, addition modules 310, 312, and 314, respectively, and a modification module 316. The control module 30 may include modules other than those described herein and may include additional of fewer modules than those generally illustrated and described herein. FIG. 3A also illustrates a frequency transfer module P(s) that may be implemented using motor 20. The inverter 22 between the control module 30 and the motor 20 is not depicted in FIG. 3A for the simplicity of illustration and description.

The motor 20 may receive an input voltage command $V_M$ and may generate torque (e.g., draws or generates current $I_P$, which may be the phase current described in connection with FIGS. 1 and 2). The motor 20 may be a plant that is being controlled by the control module 30 so as to generate a frequency response (e.g., the torque, or the drawn/output current $I_P$) from an input signal (i.e., the input voltage command $V_M$). As can be appreciated, the frequency response that the motor 20 generates may be governed by a set of model equations that define one or more transfer functions to transform the input voltage command $V_M$ to the output current $I_P$. In other words, the control module 30 may regulate the output current $I_P$ by sending the input voltage command $V_M$ generated based on the models.

In some embodiments, the control module 30 may include a feedback controller having closed-loops. For example, a disturbance current $I_{dist}$ and a noise current $I_{noise}$ are added to the output current $I_P$ (e.g., using addition module 312 and addition module 314, respectively) to determine a feedback current $I_M$ that is provided back to the control module 30. This may allow the control module 30 to use the feedback current $I_M$ to regulate subsequently generated output current $I_P$ of the motor 20. In some embodiments, a current sensor (not shown) may measure the feedback current $I_M$ and may provide a current measurement of the feedback current $I_M$ to the control module 30.

In some embodiments, the modification module 316 may receive the feedback current $I_M$. For example, the modification module 316 may receive the feedback current $I_M$ from the motor 20, from the addition module 314, from a sensor, and/or the like.

In some embodiments, the modification module 316 may, based on the feedback current $I_M$, decouple the d-axis portion $V_a$ and the q-axis portion $V_q$ of the input voltage command $V_M$, as will be described further herein. By decoupling the d-axis portion $V_a$ of the input voltage command $V_M$, the modification module 316 eliminates the influence of the variations of the q-axis terms on the d-axis portion of the input voltage command $V_M$ and eliminates the influence of the variations of the d-axis terms on the q-axis portion of the voltage command.

In some embodiments, the modification module 316 may generate a compensated voltage command $V_H$ that cancels or compensates for the variations in coupled currents, inductances, stator resistance variations, measurement inaccuracies, and/or the like, on the input voltage command $V_M$. As will be described, the compensated voltage command $V_H$ may be used to generate a decoupled input voltage command $V_M$ that, when supplied to the motor 20, causes the motor 20 to generate a frequency response (e.g., the output current $I_P$) without being affected by the variations of the coupled terms (e.g., currents, inductances, etc.).

In some embodiments, the subtraction module 304 may determine a difference current $I_E$. For example, the subtraction module 304 may determine a difference current $I_E$ between a commanded current IR and a measured current $I_M$. In some embodiments, the subtraction module 304 may provide the difference current $I_E$ to the compensation and integration module 306.

In some embodiments, the compensation and integration module 306 may include a proportion controller. Additionally, or alternatively, the compensation and integration module 306 may include an integration controller.

In some embodiments, the proportion controller may be configured to assist the motor 20 in generating a frequency response that is a first order type response. In some embodiments, the proportion controller may be configured to assist the motor 20 in generating a frequency response that is a higher order type response (e.g., a second order response, a third order response, etc.).

In some embodiments, the compensation and integration module 306 (e.g., using a proportional compensation sub-module $C_P(s)$) may generate a proportional voltage command $V_P$ from the difference current $I_E$ provided by the subtraction module 304. This allows the proportion controller to provide beneficial tradeoffs between the motor input disturbance transfer function behavior and the current measurement noise transfer function behavior.

In some embodiments, the integration controller, which may be part of the compensation and integration module 306 (components of which are shown, for example, in FIGS. 4-6), may receive the difference current $I_E$. In some embodiments, the integration controller may determine an integral voltage command $V_1$ and may provide the integral voltage command $V_1$ to an addition module (e.g., which may be included in the compensation and integration module 306). In some embodiments, the addition module may add the proportional voltage commands $V_P$ and the integral voltage command $V_1$ to determine a compensated voltage command $V_C$. The compensated voltage command $V_C$ may be provided to the filtering module 318, along with one or more other compensated voltage commands, as will be described further herein.

In some embodiments, the BEMF compensation module 302 may be configured in a manner that compensates for dynamics (e.g., variations) of BEMF voltage that are slower than the dynamics of the stator phase current of the motor 20. For example, the BEMF compensation module 302 may be configured to receive a rotor mechanical velocity an as input and to generate compensated voltage command $V_F$ that compensates for the dynamics of the BEMF voltage. In some embodiments, the BEMF compensation module 302 may provide the compensated voltage command $V_F$ to the addition module 308.

In some embodiments, the addition module 308 may add one or more compensated voltages to generate a total (known) compensated voltage command $V_R$. For example, the addition module 308 may add the compensated voltage command $V_H$ and the compensated voltage command $V_C$ to determine a total (known) compensated voltage command $V_R$ that allows the motor 20 to generate a stable frequency response that is not affected by the dynamics of the resistances of the motor 20 and/or any inaccurate estimation of the resistances. As described herein, a total (known) compensated voltage command $V_R$ may refer to a total compensated voltage command that is known or determined within the control module 30. Similarly, a total compensated voltage command $V_M$, as described herein, may refer to a total compensated voltage command that includes unknown disturbances $V_{dist}$ originating outside of the control module 30.

Figure 3B:
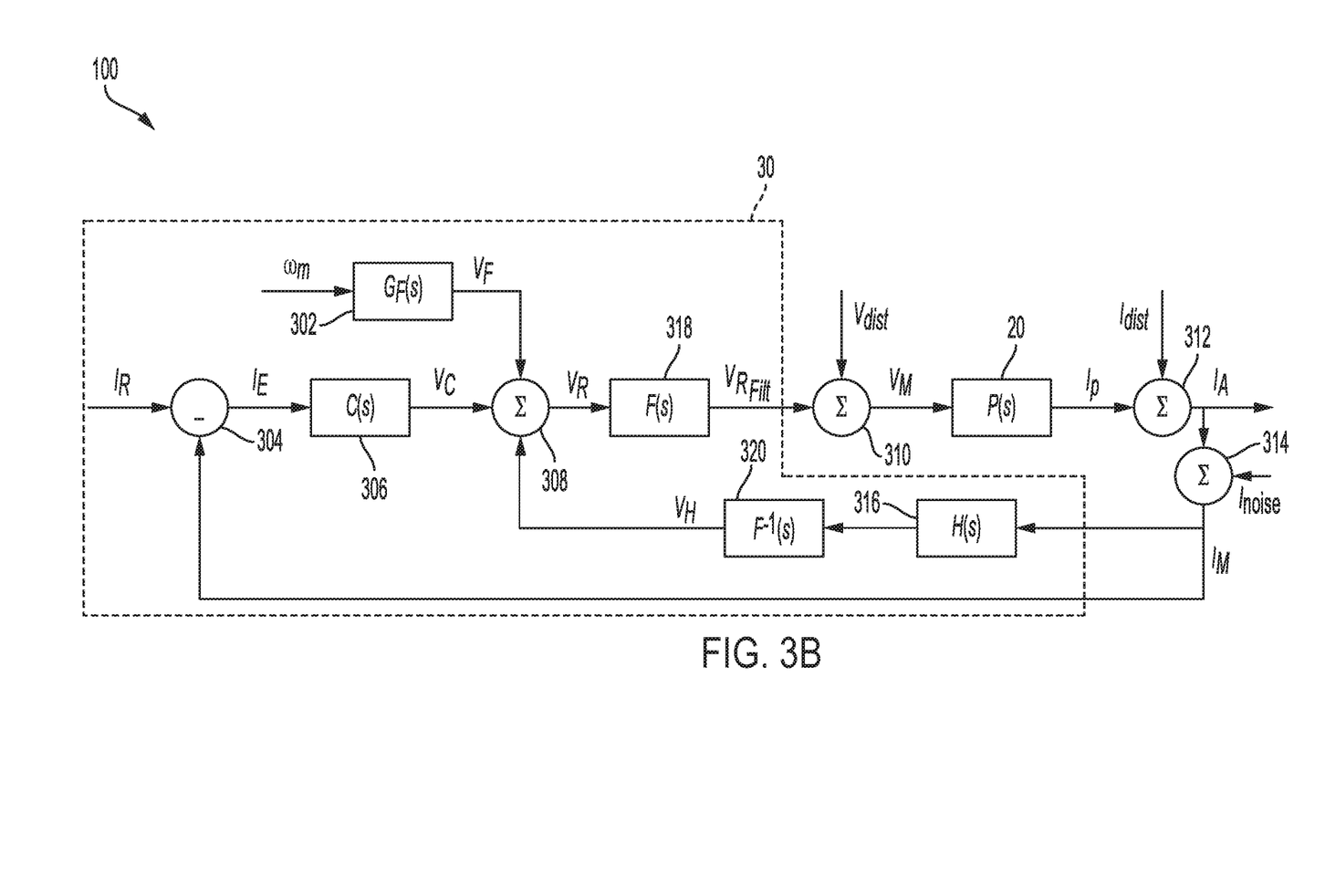

FIG. 3B generally illustrates a block diagram of the control system 100 using a filtering module 318 and an inverse filtering module 320 for noise cancellation. In some embodiments, the addition module 308 may provide the total (known) compensated voltage command $V_R$ to the filtering module 318. In some embodiments, the filtering module 318 may filter the total (known) compensated voltage command $V_R$ (e.g., to output a filtered compensated voltage command $V_{R_{Filt}}$). For example, the filtering module 318 may filter the total (known) compensated voltage command $V_R$ using a transfer matrix F(s), as will be shown further herein. The total (known) compensated voltage command $V_R$ may include a d-axis portion and a q-axis portion.

In some embodiments, the filtering module 318 may perform the filtering using a set of low-pass filters. Additionally, or alternatively, the filtering module 318 may perform the filtering using a lead-lag filter. Additionally, or alternatively, the filtering module 318 may perform the filtering using a control band reject (notch) filter. Additional information regarding each respective type of filtering is provided further herein.

In some embodiments, the inverse filtering module 320 may be used to preserve the decoupling between the d-axis and q-axis. For example, the inverse filtering module 320 may be implemented as part of a feedback loop to determine a compensated voltage command $V_H$ that may be provided to and used by the filtering module 318. The compensated voltage command $V_H$ may include a compensated d-axis component and a compensated q-axis component. In some embodiments, the inverse filtering module 320 may determine the compensated voltage command $V_H$ by applying, to an output of the modification module 316, a set of gain factors using a transfer matrix for one or more filters. Additional information regarding gain factors and filtering is provided further herein.

In some embodiments, the addition module 310 may add the filtered voltage command $V_{R_{Filt}}$ and unknown disturbances $V_{dist}$ to determine a total compensated voltage command $V_M$ (referred to herein as an input voltage command $V_M$) that includes unknown disturbances such as $V_{dist}$, which originate outside of the control module 30. $V_{dist}$ may, for example, represent unknown input disturbances that are inherent within control system 10 or a device or machine that utilizes control system 10.

In some embodiments, the addition module 310 may provide the input voltage command $V_M$ to the motor 20. In this way, the motor 20 receives an input voltage command $V_M$ that decouples the d-axis portion and q-axis portion and excludes NVH-related disturbances that have been filtered by the filtering module 318.

Figure 4:
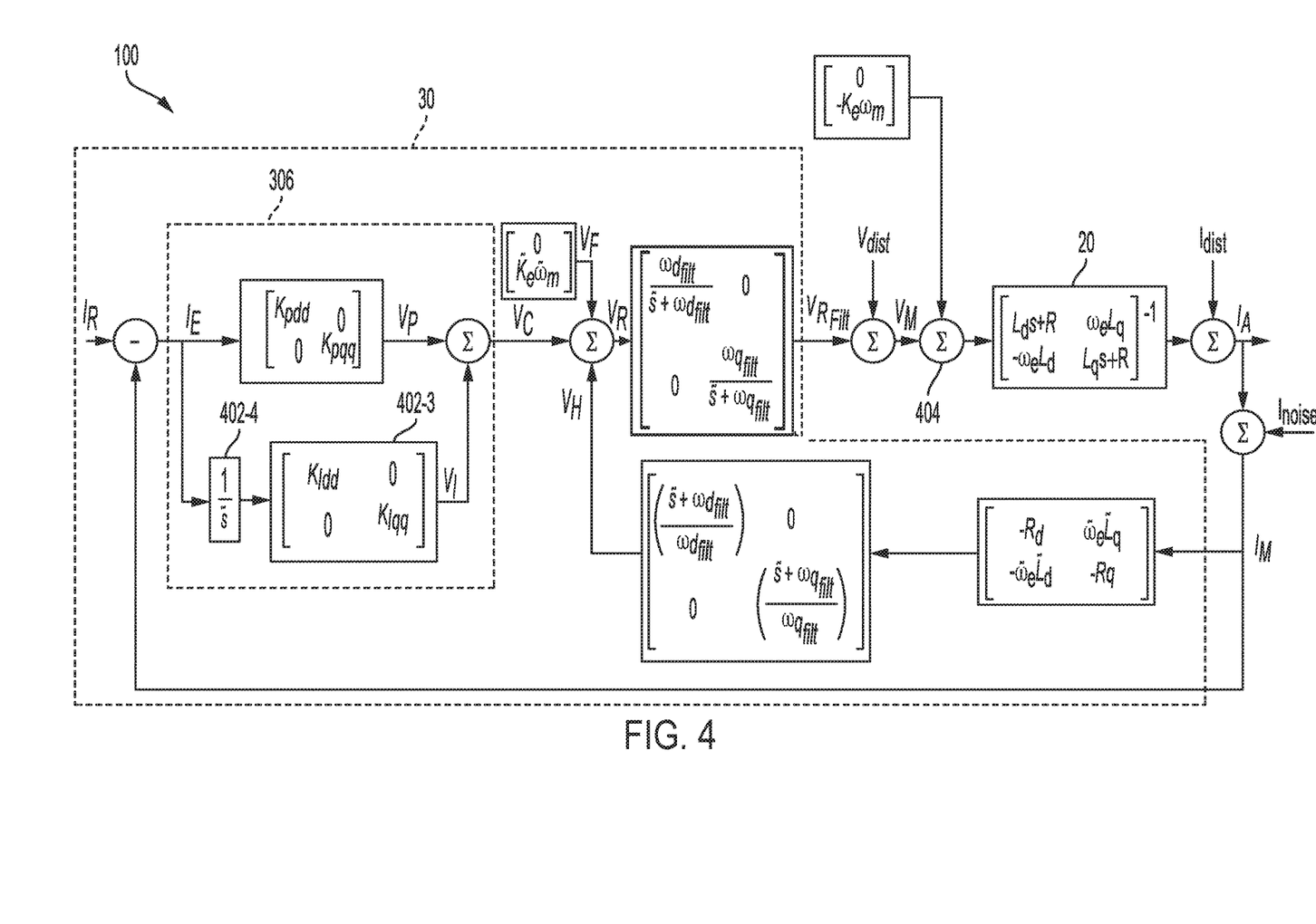
FIG. 4 generally illustrates another block diagram of the control system using the one or more of modules for noise cancellation, according to the principles of the present disclosure.

FIG. 4 illustrates a block diagram of the control module 30 according to the principles of the present disclosure. In particular, the modules are illustrated to include transfer matrices, which include transfer matrices for one or more low pass filters. It is to be noted that the modules are illustrated to include these matrices in order to facilitate ease of understanding regarding what the modules are configured to do.

In some embodiments, the control module 30 is configured to generate an input voltage command $V_M$ using a motor control model for line-to-neutral voltage equations:

$$V_d = L_d \frac{dI_d}{dt} + RI_d + \frac{N_p}{2}\omega_m L_q I_q \qquad \text{(Equation 1)}$$

$$V_q = L_q \frac{dI_q}{dt} + RI_q - \frac{N_p}{2}\omega_m L_d I_d + K_e \omega_m \qquad \text{(Equation 2)}$$

$$T_e = \frac{3}{2}K_e I_q + \frac{3}{4}N_p(L_q - L_d)I_d I_q \qquad \text{(Equation 3)}$$

In the equations above, $V_d$ and $V_g$ are the d-axis and q-axis motor voltages (in Volts), respectively, $I_d$ and $I_q$ are the d-axis and q-axis motor currents (in Amperes), respectively, $L_d$ and $L_g$ are the d-axis and q-axis motor inductances (in Henries), respectively, R is the motor circuit (i.e., the motor and controller) resistance (in Ohms), $K_e$ is the motor BEMF coefficient (in Volts/rad/s), $\omega_n$ is the mechanical motor velocity in (in rad/s); $N_p$ is a number of poles of the motor 20, and $T_e$ is the electromagnetic motor torque (in Nm).

It is to be noted that equation 3 for computing the electromagnetic motor torque $T_e$ is nonlinear and that equation 3 represents a sum of the torque developed by leveraging the magnetic field from the permanent magnets and the reluctance torque generated by the rotor saliency (i.e., a difference between $L_d$ and $L_q$) and desired values for $I_d$ and $I_q$. A reference model design for optimizing selection of the reference currents $I_d$ and $I_q$ to use for PMSM control is described in U.S. Patent Application, entitled "Generation of a Current Reference to Control a Brushless Motor," filed Nov. 26, 2013, which is incorporated herein by reference in its entirety.

The parameters in equations 1-3 vary significantly during normal operation of the motor 20—potentially over 100% variation in R, and 5-20% variation in inductances $L_d$ and $L_g$ and 15-20% in $K_e$. R may vary with the build and the temperature of the motor 20. $L_d$ and $L_q$ vary due to saturation (i.e., as a function of $I_d$ and $I_q$ and $K_e$ varies due to saturation (as a function of $I_q$ and with the temperature).

Some embodiments are described herein in connection with transfer matrices. In one or more of these embodiments, the transfer matrices may be dynamic transfer matrices. That is, gains (i.e., terms) included in a transfer matrix may be dynamic values that update in real-time or near real-time. To provide a specific example, transfer matrix H and transfer matrix $F^{-1}(s)$ (described further herein) may be dynamic transfer matrices that are part of a state feedback loop.

In the equations 1 and 2, $$\frac{N_P}{2}\omega_m$$

is electrical motor velocity $\omega_e$ of the motor 20. The electrical motor velocity is assumed to be a slowly varying parameter. BEMF has been compensated for using BEMF compensation module 302. However, BEMF of the motor 20 may represent an unknown or inherent disturbance originating outside of control module 30 (and therefore may also need to be filtered). Due to relatively slow flux dynamics, the quasi-static back-EMF (BEMF) term $K_e \omega_m$ may be considered a constant, and may be compensated as another disturbance using compensation module. The addition module adds this disturbance with the input voltage command $V_M$. These two assumptions allow linearization of equations 1 and 2 for a fixed velocity of the motor 20. Accordingly, the equations 1 and 2 may be re-written as the following linear equations 4 and 5, respectively:

$$V_d = L_d \dot{I}_d + RI_d + \omega_e L_q I_q \quad \text{(Equation 4)}$$

$$V'_q = V_q - K_e \omega_m = L_q \dot{I}_q + RI_q - \omega_e L_d I_d \quad \text{(Equation 5)}$$

Further, equations 4 and 5 can be compactly written using s-domain representation as follows:

$$U = P_i(s)X \quad \text{(Equation 6)}$$

$$\begin{bmatrix} V_d \\ V'_q \end{bmatrix} = \begin{bmatrix} L_d s + R & \omega_e L_q \\ -\omega_e L_d & L_q s + R \end{bmatrix} \begin{bmatrix} I_d \\ I_q \end{bmatrix} \quad \text{(Equation 7)}$$

In equations above, U may be an input voltage matrix $$\begin{bmatrix} V_d \\ V'_q \end{bmatrix},$$

$P_i(s)$ may be a complex frequency transfer matrix $$\begin{bmatrix} L_d s + R & \omega_e L_q \\ -\omega_e L_d & L_q s + R \end{bmatrix},$$

and X may be a matrix $$\begin{bmatrix} I_d \\ I_q \end{bmatrix}.$$

In equation 7, the output current matrix X of the motor 20 is converted to the input voltage matrix U via the complex frequency transfer matrix $P_i(s)$. The complex frequency transfer matrix $P_i(s)$ is the inverse of a true transfer matrix P(s) (e.g., P(s) may be an actual plant transfer matrix). This $P_i(s)$ is shown to be included in the motor 20 in FIG. 4. $P_i(s)$ can be also denoted as $P^1$ to indicate that $P_i(s)$ is the inverse of P(s). It is to be noted that the elements of $P_i(s)$, not P(s), are shown to be included in the motor 20 to correspond to the elements included in the transfer matrix H (described further herein).

The actual plant transfer matrix P(s) that converts the input voltage to the output current may be written as:

$$X = P(s)U \quad \text{(Equation 8)}$$

$$\begin{bmatrix} I_d \\ I_q \end{bmatrix} = \frac{1}{L_d L_q s^2 + R(L_d + L_q)s + R^2 + \omega_e^2 L_d L_q} \quad \text{(Equation 9)}$$

$$\begin{bmatrix} L_q s + R & -\omega_e L_q \\ \omega_e L_d & L_d s + R \end{bmatrix} \begin{bmatrix} V_d \\ V'_q \end{bmatrix} = \frac{1}{\Delta(s)} \begin{bmatrix} L_q s + R & -\omega_e L_q \\ \omega_e L_d & L_d s + R \end{bmatrix} \begin{bmatrix} V_d \\ V_q \end{bmatrix},$$

where $P(s)$ is $\frac{1}{\Delta(s)} \begin{bmatrix} L_q s + R & -\omega_e L_q \\ \omega_e L_d & L_d s + R \end{bmatrix}$ In some embodiments, the modification module 316 may decouple the coupling terms in equations 4 and 5 (or the corresponding elements in the transfer matrix $P_i(s)$ or the transfer matrix P(s)). For example, the modification module 316 may use the transfer matrix H to decouple the coupling terms in equations 4 and 5 (or the corresponding elements in the transfer matrix $P_1(s)$ or the transfer matrix P(s)). Specifically, the off-diagonal elements of the transfer matrix H are selected to cancel the off-diagonal elements of $P_i(s)$, which correspond to the coupling terms of the equations 4 and 58. The off-diagonal elements of H(s) may be expressed as follows:

$$K_{Hdq} = \tilde{\omega}_e \tilde{L}_q \quad \text{(Equation 10)}$$

$$K_{Hqd} = -\tilde{\omega}_e \tilde{L}_d \quad \text{(Equation 11)}$$

In equations 10 and 11, e is an estimated electrical motor velocity of the motor 20, $\tilde{L}_q$ is an estimated q-axis inductance of the motor 20, and $\tilde{L}_d$ is an estimated d-axis inductance of the motor 20.

The modification module 316 may also desensitize the motor 20 from the variations of motor operation parameters (i.e., reduces influence of the variations), especially from the variations in the motor resistance, so that the motor 20 generates a stable frequency response (e.g., the output current). The diagonal elements of the transfer matrix H may be expressed as follows:

$$K_{Hdd} = -R_d \quad \text{(Equation 12)}$$

$$K_{Hdq} = -R_q \quad \text{(Equation 13)}$$

In equations 12 and 13, $-R_d$ and $-R_q$ are virtual resistance values (in Ohms). $R_d$ and $R_q$ values are selected and specifically configured to balance control system sensitivity to motor parameter variations (specifically, the variations in resistance, which typically swings as large as 100% over temperature), voltage disturbance rejection transfer function properties, and current measurement noise sensitivity properties. Moreover, because of the $-R_d$ and $-R_q$, the time for the motor 20 to respond to the voltage command gets shortened or reduced (i.e., a faster response time is resulted.). Accordingly, the transfer matrix H may be written as:

$$H = \begin{bmatrix} -R_d & \bar{\omega}_e L_q \\ -\bar{\omega}_e L_d & -R_q \end{bmatrix}$$ (Equation 14)

It is to be noted that these elements of the transfer matrix H are scheduled in terms of motor parameters, which are nonlinear and continuously changing with the motor's operating conditions (e.g., temperature, resistance, etc.).

In some embodiments, such as when the filtering module 318 may be used to filter NVH-related disturbances (as described further herein), the filtering will result in a coupling (or re-coupling) of the d-axis portion and q-axis portion of the compensated voltage command $V_M$. For example, the filtering module 318 may receive a compensated voltage command $V_H$, a compensated command voltage $V_C$, and/or a compensated voltage command $V_F$, which may be collectively referred to as compensated voltage command $V_R$.

In some embodiments, the filtering module 318 may use a transfer matrix $F_{LP}$ to filter NVH-related disturbances in the compensated voltage command $V_R$. The transfer matrix $F_{LP}$ is shown in FIG. 4 as follows:

$$F_{LP} = \begin{bmatrix} \dfrac{\omega_{d_{filt}}}{\tilde{s} + \omega_{d_{filt}}} & 0 \\ 0 & \dfrac{\omega_{q_{filt}}}{\tilde{s} + \omega_{q_{filt}}} \end{bmatrix}$$ (Equation 15)

In some embodiments, $\tilde{s}$ may be equal to $$\frac{s}{\tau s + 1}$$

where τ represents a low pass filter time constant. In some embodiments, in the transfer matrix $F_{LP}$, a low pass filter $$\frac{\omega_{filt}}{\tilde{s} + \omega_{filt}}$$

may be applied to each portion of the compensated voltage command $V_R$. In some embodiments, a filter value applied to the d-axis portion of the compensated voltage command $V_R$ may be same filter value applied to the q-axis portion of the compensated voltage command $V_R$. In some embodiments, the filter value applied to the d-axis portion of the compensated voltage command $V_R$ may be a different filter value than the value applied to the q-axis portion of the compensated voltage command $V_R$.

In some embodiments, the inverse filtering module 320 may determine the compensated voltage command $V_H$ in a manner that preserves the decoupling of the d-axis and q-axis. The compensated voltage command $V_H$ may include a compensated d-axis component and a compensated q-axis component. For example, the modification module 316 may preserve decoupling by using a first set of gain factors (described elsewhere herein) to generate a compensated voltage command $V_H$ that cancels or compensates for the variations in coupled currents, inductances, stator resistance variations, measurement inaccuracies, and/or the like, on an input voltage command $V_M$. To preserve the decoupling, the inverse filtering module 320 may determine the compensated voltage command $V_H$ by applying, to an output of the modification module 316, a second set of gain factors using a transfer matrix $F_{LP}^{-1}$ for one or more low-pass filters. The transfer matrix $F_{LP}^{-1}$ may, for example, be a dynamic gain transfer matrix. The transfer matrix $F_{LP}^{-1}$ is shown in FIG. 4 as follows:

$$F_{LP}^{-1} = \begin{bmatrix} (\tilde{s} + \omega_{d_{filt}})/\omega_{d_{filt}} & 0 \\ 0 & (\tilde{s} + \omega_{q_{filt}})/\omega_{q_{filt}} \end{bmatrix}$$ (Equation 16)

In the transfer matrix $F_{LP}^{-1}$ shown by equation 16, $\tilde{s}$ represents an approximation of variable s, which may be implemented in discrete time and may be represented as $$\frac{s}{\tau s + 1},$$

τ represents a low pass filter time constant, $\omega_{d_{filt}}$ represents a low pass filter cut-off frequency applied to d-axis portion of the compensated voltage command $V_H$, and $\omega_{q_{filt}}$ represents a low pass filter cut-off frequency applied to a q-axis portion of the compensated voltage command $V_H$. A filter, such as a low pass filter, another type of filter described herein, or any other suitable filter, may represent a cut off frequency, a cut off amplitude, a cut off phase characteristic value, a cut off tonal characteristic value, and/or the like.

Because of the disturbances and noises, namely $V_{dist}$, $I_{dist}$, and $I_{noise}$, as shown in FIG. 4 ($I_{dist}$, and $I_{noise}$ are combined with the output current $I_P$ by the addition modules 312 and 314), the transfer matrix of the motor 20 seen by the control module 30 is not P(s). That is, the actual transfer matrix of the motor 20 seen by the control module 30 should factor in all the disturbances and noises. In this disclosure, the actual transfer matrix seen by the control module 30 is referred to as an effective transfer matrix, $P_{eff}$. The modified effective transfer matrix $P_{eff}$ is defined as:

$$P_{eff} = (F^{-1}(s)(P_i(s) - H(s)))^{-1}$$ (Equation 17)

That is, $P_{eff}$ may be defined as the inverse of $F^{-1}(s)(P_i(s) - H(s))$. Thus, the effective inverse transfer matrix $P_{ieff}$ is $F^{-1}(s)(P_i(s) - H(s))$, which can be written in a matrix form:

$$P_{ieff} =$$ (Equation 18)

$$\begin{bmatrix} (L_d S + R - K_{Hdd})(\tilde{s} + \omega_{d_{filt}}/\omega_{d_{filt}}) & -\omega_e L_q + K_{Hdq} - 0 \\ \omega_e L_d + K_{Hqd} - 0 & (L_d S + R - K_{Hdd})(\tilde{s} + \omega_{d_{filt}}/\omega_{d_{filt}}) \end{bmatrix}$$

In some embodiments, the diagonal elements of the transfer matrix H, namely $K_{Hdd}$ and $K_{Hdq}$, may be configured to have negative values so as to ensure the corresponding diagonal elements of the $P_{ieff}$ are positive. As can be appreciated, the diagonal elements $(R-K_{Hdd})$ and $(R-K_{Hdq})$ of the $P_{ieff}$ should be greater than zero (i.e., a positive resistance value) in order to maintain the stability of the motor 20 in the presence of variations in resistance. With these elements in the transfer matrix H and in the transfer matrix $F_{LP}^{-1}$, and with the assumption that $\tilde{\omega}_e$, $\tilde{L}_d$ and $\tilde{L}_q$ are accurate estimations, the effective motor transfer matrix $P_{eff}$ may be defined as:

$$P_{eff} = \begin{bmatrix} \dfrac{1}{L_d s + R + R_d} * \dfrac{\omega_{d_{filt}}}{\tilde{s} + \omega_{d_{filt}}} & 0 \\ 0 & \dfrac{1}{L_q s + R + R_q} * \dfrac{\omega_{q_{filt}}}{\tilde{s} + \omega_{q_{filt}}} \end{bmatrix} \quad \text{(Equation 19)}$$

As can be appreciated, the diagonal elements $(R-K_{Hdd})$ and $(R-K_{Hdq})$ of the $P_{ieff}$ should be greater than zero (i.e., a positive resistance value) in order to maintain the stability of the motor 20 in the presence of variations in resistance.

The control module 30 may decouple the d-axis portion of the compensated voltage command $V_M$ from the q-axis portion of the compensated voltage command $V_M$, such that the d-axis portion of the compensated voltage command $V_M$ does not affect a q-axis portion of current and such that the q-axis portion of the compensated voltage command $V_M$ does not affect a d-axis portion of the current. Furthermore, by using the transfer matrix H and the transfer matrix $F_{LP}^{-1}$ to generate the compensated voltage command $V_H$ in a manner that preserves decoupling of the d-axis portion and q-axis portion of the voltage command $V_M$, the control module 30 conserves resources (e.g., processing resources, memory resources, and/or the like) relative to an inferior system that is only able to filter NVH-related disturbances at the expense of coupling or recoupling the d-axis and q-axis portions of the compensated voltage command $V_M$. Other example filters are described in connection with FIGS. 5 and 6.

Figure 5:
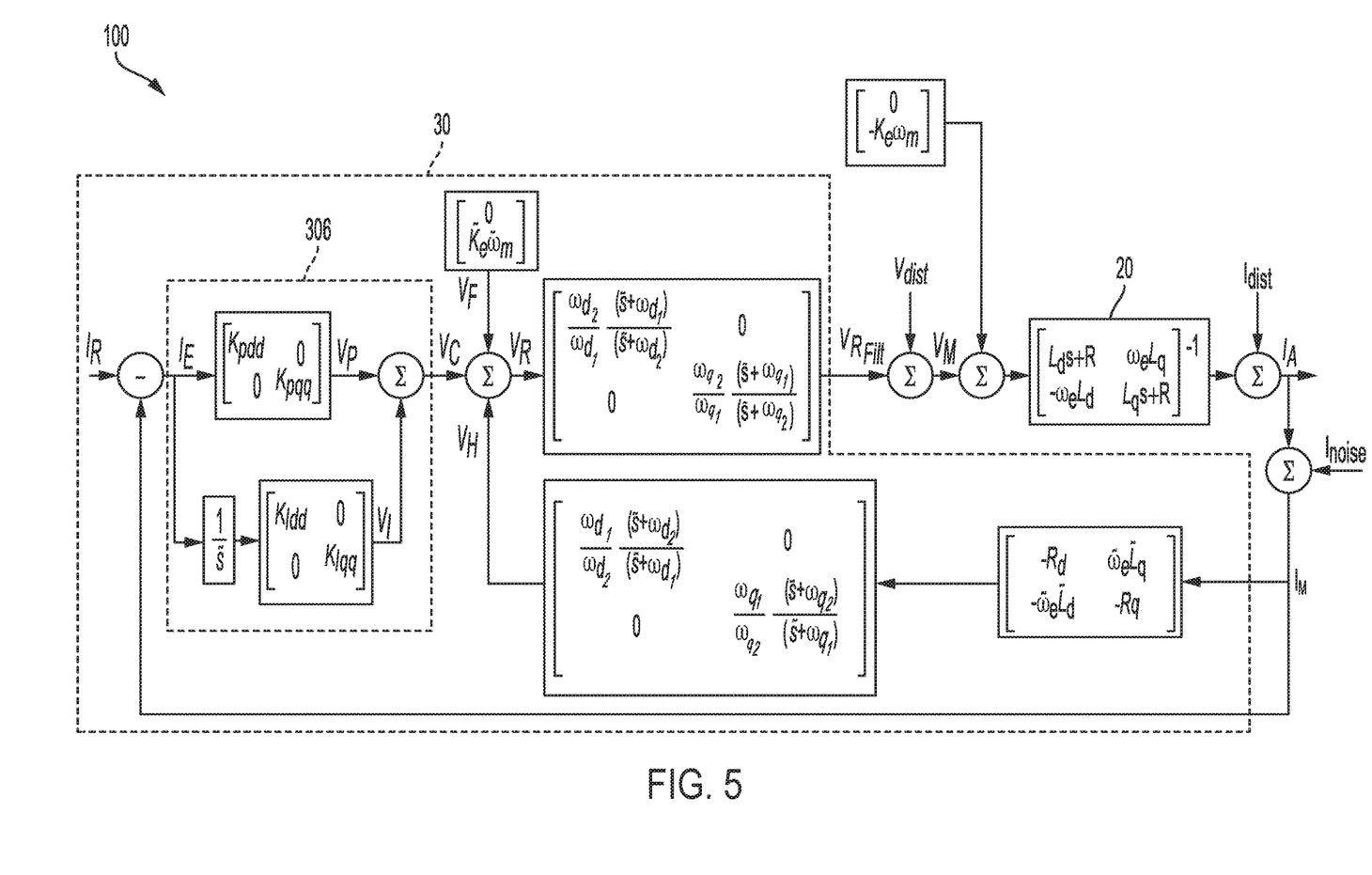
FIG. 5 generally illustrates another block diagram of the control system using the one or more of modules for noise cancellation, according to the principles of the present disclosure.

FIG. 5 illustrates a block diagram of the control module 30 according to the principles of the present disclosure. In particular, the modules are illustrated to include transfer matrices, which include transfer matrices for one or more lead-lag filters.

The transfer matrix $F_{LL}$ is shown in FIG. 5 as follows:

$$F_{LL} = \begin{bmatrix} (\omega_{d_2}(\tilde{s} + \omega_{d_1}) / \omega_{d_1}(\tilde{s} + \omega_{d_2})) & 0 \\ 0 & (\omega_{q_2}(\tilde{s} + \omega_{q_1}) / \omega_{q_1}(\tilde{s} + \omega_{q_2})) \end{bmatrix} \quad \text{(Equation 20)}$$

In the transfer matrix $F_{LL}$, a lead-lag filter $\omega_2(\tilde{s}+\omega_1)/\omega_1(\tilde{s}+\omega_2)$ may be applied to each portion of the compensated voltage command $V_R$. In some embodiments, $\tilde{s}$ may be equal to $$\frac{s}{\tau s + 1}$$

where $\tau$ represents a low pass filter time constant. In some embodiments, a filter value applied to the d-axis portion of the compensated voltage command $V_R$ may be same filter value applied to the q-axis portion of the compensated voltage command $V_R$. In some embodiments, the filter value applied to the d-axis portion of the compensated voltage command $V_R$ may be a different filter value than the value applied to the q-axis portion of the compensated voltage command $V_R$.

The transfer matrix $F_{LL}^{-1}$ is shown in FIG. 5 as follows:

$$F_{LL} = \begin{bmatrix} (\omega_{d_1}(\tilde{s} + \omega_{d_2}) / \omega_{d_2}(\tilde{s} + \omega_{d_1})) & 0 \\ 0 & (\omega_{q_1}(\tilde{s} + \omega_{q_2}) / \omega_{q_2}(\tilde{s} + \omega_{q_1})) \end{bmatrix} \quad \text{(Equation 21)}$$

In the transfer matrix $F_{LL}^{-1}$, an inverse lead-lag filter $\omega_1(\tilde{s}+\omega_2)/\omega_2(\tilde{s}+\omega_1)$ may be applied to each portion of the compensated voltage command $V_H$. In some embodiments, a filter value applied to the d-axis portion of the compensated voltage command $V_H$ may be same filter value applied to the q-axis portion of the compensated voltage command $V_H$. In some embodiments, the filter value applied to the d-axis portion of the compensated voltage command $V_H$ may be a different filter value than the value applied to the q-axis portion of the compensated voltage command $V_H$.

By implementing the transfer matrix $F_{LL}^{-1}$ in the state feedback loop, the transfer matrix $F_{LL}$ may be used to filter NVH-related disturbances while allowing decoupling between the d-axis portion and q-axis portion of the compensated voltage command $V_M$ that is output by the filtering module 318 to be preserved.

Figure 6:
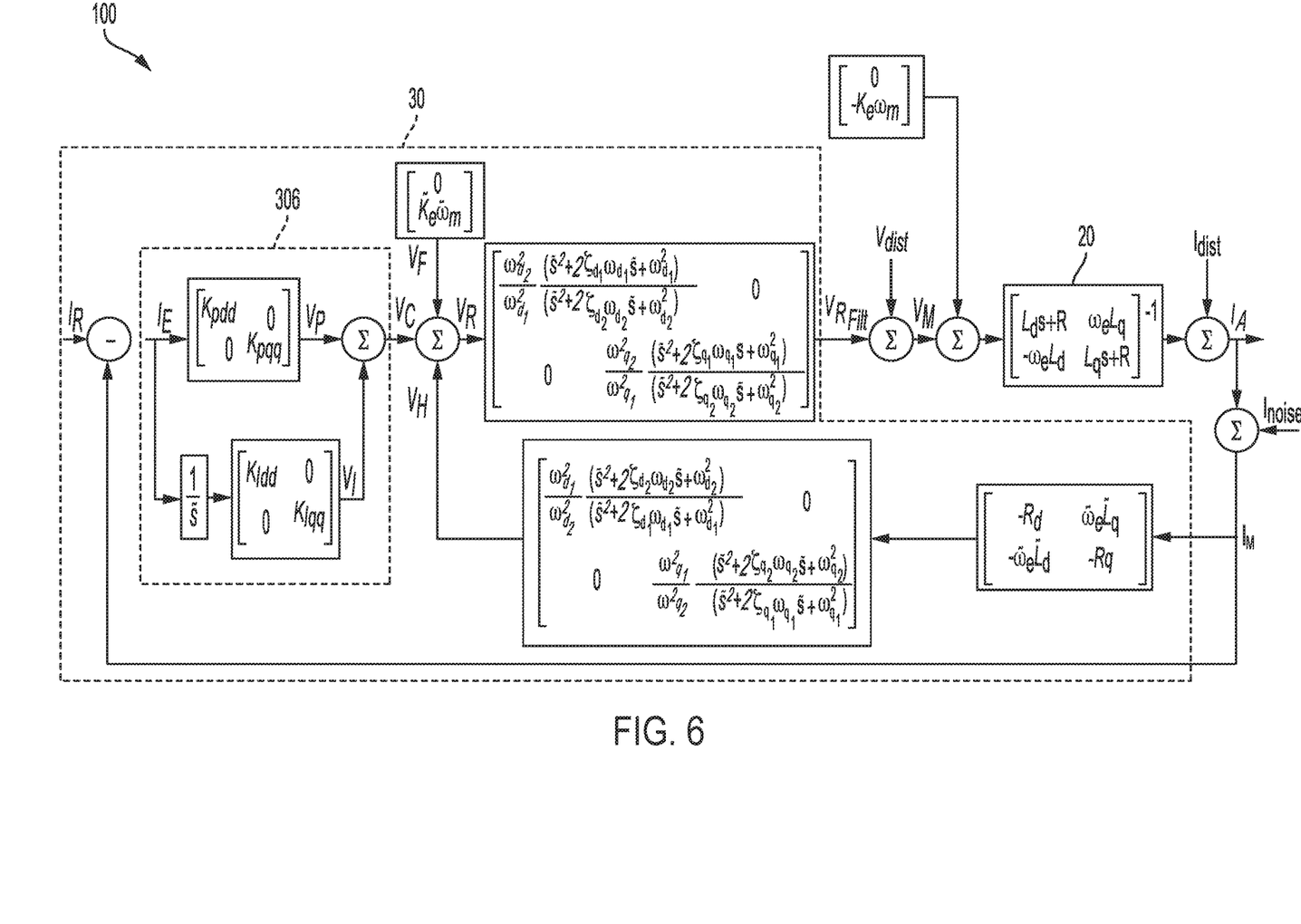
FIG. 6 generally illustrates another block diagram of the control system using the one or more of modules for noise cancellation, according to the principles of the present disclosure.

FIG. 6 illustrates a block diagram of the control module 30 according to the principles of the present disclosure. In particular, the modules are illustrated to include transfer matrices, which include transfer matrices for one or more control band reject (notch) filters. It is to be noted that the modules are illustrated to include these matrices in order to facilitate ease of understanding regarding what the modules are configured to do.

The transfer matrix $F_N$ is shown in FIG. 6 as follows:

$$F_N = \begin{bmatrix} \frac{\omega_{d_2}^2 (\tilde{s}^2 + 2\zeta_{d_1}\omega_{d_1}\tilde{s} + \omega_{d_1}^2)}{\omega_{d_1}^2 (\tilde{s}^2 + 2\zeta_{d_2}\omega_{d_2}\tilde{s} + \omega_{d_2}^2)} & 0 \\ 0 & \frac{\omega_{q_2}^2 (\tilde{s}^2 + 2\zeta_{q_1}\omega_{q_1}\tilde{s} + \omega_{q_1}^2)}{\omega_{q_1}^2 (\tilde{s}^2 + 2\zeta_{q_2}\omega_{q_2}\tilde{s} + \omega_{q_2}^2)} \end{bmatrix} \quad \text{(Equation 22)}$$

In the transfer matrix $F_N$, a notch filter $$\frac{\omega_2^2 (\tilde{s}^2 + 2\zeta_1\omega_1\tilde{s} + \omega_1^2)}{\omega_1^2 (\tilde{s}^2 + 2\zeta_2\omega_2\tilde{s} + \omega_2^2)}$$

may be applied, where $\zeta$ is a damping ratio and $\omega$ is a natural frequency that may be applied to each portion of the compensated voltage command $V_R$. In some embodiments, $\tilde{s}$ may be equal to $$\frac{s}{\tau s + 1}$$

where $\tau$ represents a low pass filter time constant. In some embodiments, a filter value applied to the d-axis portion of the compensated voltage command $V_R$ may be same filter value applied to the q-axis portion of the compensated voltage command $V_R$. In some embodiments, the filter value applied to the d-axis portion of the compensated voltage command $V_R$ may be a different filter value than the value applied to the q-axis portion of the compensated voltage command $V_R$.

The transfer matrix $F_N^{-1}$ is shown in FIG. 6 as follows:

$$F_N^{-1} = \quad \text{(Equation 23)}$$

$$\begin{bmatrix} \frac{\omega_{d_1}^2 (\tilde{s}^2 + 2\zeta_{d_2}\omega_{d_2}\tilde{s} + \omega_{d_2}^2)}{\omega_{d_2}^2 (\tilde{s}^2 + 2\zeta_{d_1}\omega_{d_1}\tilde{s} + \omega_{d_1}^2)} & 0 \\ 0 & \frac{\omega_{q_1}^2 (\tilde{s}^2 + 2\zeta_{q_2}\omega_{q_2}\tilde{s} + \omega_{q_2}^2)}{\omega_{q_2}^2 (\tilde{s}^2 + 2\zeta_{q_1}\omega_{q_1}\tilde{s} + \omega_{q_1}^2)} \end{bmatrix}$$

In the transfer matrix $F_N^{-1}$, an inverse notch filter $$\frac{\omega_1^2 (\tilde{s}^2 + 2\zeta_2\omega_2\tilde{s} + \omega_2^2)}{\omega_2^2 (\tilde{s}^2 + 2\zeta_1\omega_1\tilde{s} + \omega_1^2)}$$

may be applied to each portion of the compensated voltage command $V_H$. In some embodiments, a filter value applied to the d-axis portion of the compensated voltage command $V_H$ may be same filter value applied to the q-axis portion of the compensated voltage command $V_H$. In some embodiments, the filter value applied to the d-axis portion of the compensated voltage command $V_H$ may be a different filter value than the value applied to the q-axis portion of the compensated voltage command $V_H$.

By implementing the transfer matrix $F_N^{-1}$ in the state feedback loop, the transfer matrix $F_N$ may be used to filter NVH-related disturbances while allowing decoupling between the d-axis portion and q-axis portion of the compensated voltage command $V_M$ that is output by the filtering module 318 to be preserved.

Figure 7:
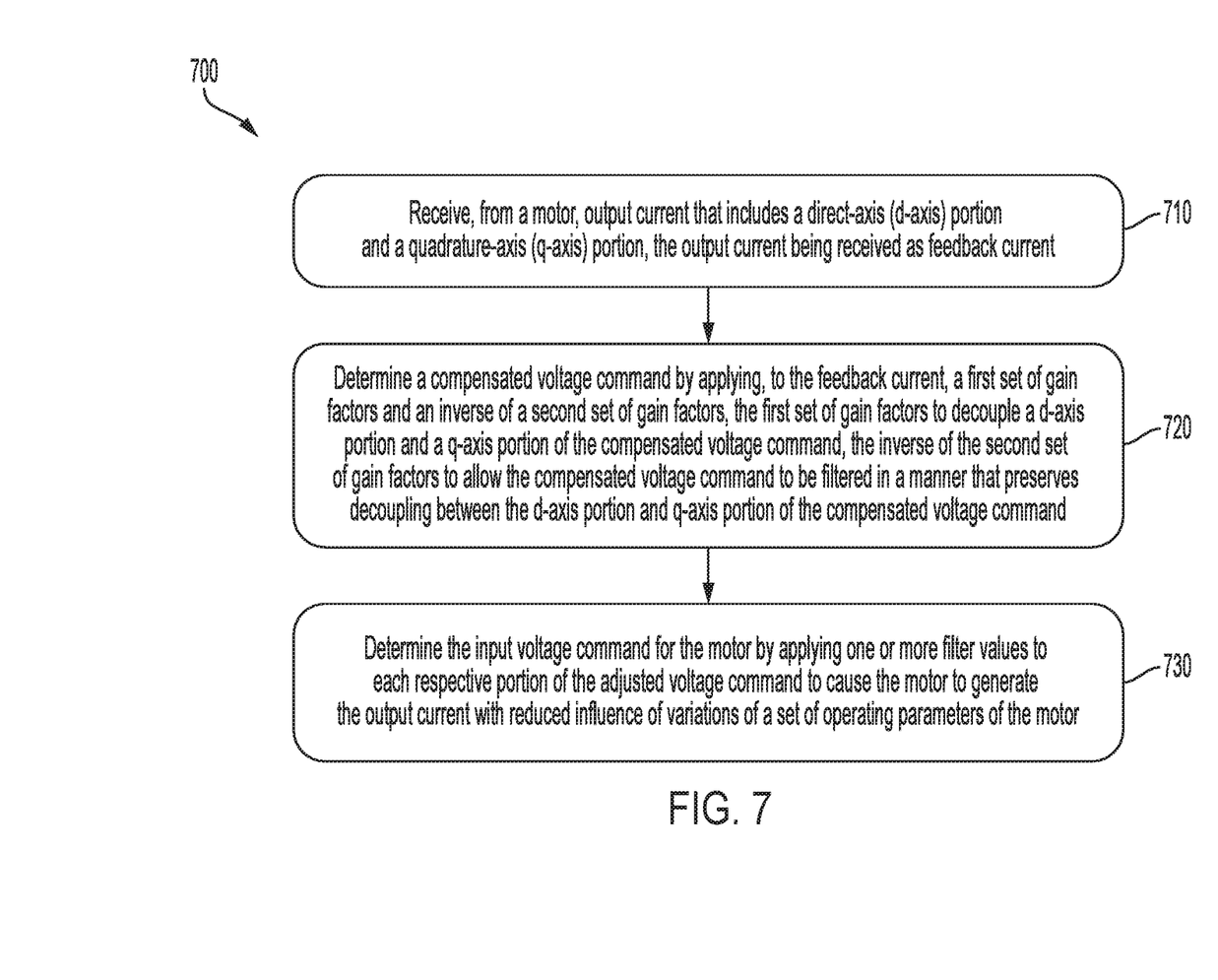
FIG. 7 is flow diagram generally illustrating a control method for controlling a motor according to the principles of the present disclosure.

FIG. 7 is a flow diagram for a control method 700 that can be performed by the control system 100 (e.g., using the control module 30) according to the principles of the present disclosure. In some embodiments, the control module 30 may be implemented as part of a motor control system that generates an output current from an input voltage command. In some embodiments, the control module 30 may be implemented as part of an electronic power steering (EPS) system using a processor and a memory. As can be appreciated in light of the disclosure, the order of operation within the method is not limited to the sequential execution as illustrated in FIG. 7, but may be performed in one or more varying orders as applicable and in accordance with the principles of the present disclosure.

At 710, the method 700 receives, from the motor 20, the output current that includes a direct-axis (d-axis) portion and a quadrature-axis (q-axis) portion, where the output current may be received as feedback current. For example, the control module 30 may receive, from the motor 20, the output current that includes a direct-axis (d-axis) portion and a quadrature-axis (q-axis) portion, where the output current may be received as feedback current.

At 720, the method 700 determines a compensated voltage command by applying, to the feedback current, a first set of gain factors and an inverse of a second set of gain factors. For example, the control module 30 may determine a compensated voltage command by applying, to the feedback current, a first set of gain factors and an inverse of a second set of gain factors. The first set of gain factors may decouple a d-axis portion and a q-axis portion of the compensated voltage command. The inverse of the second set of gain factors may be used to allow the compensated voltage command to be filtered in a manner that preserves decoupling between the d-axis and q-axis portions of the compensated voltage command.

In some embodiments, at least one of the second set of gain factors or the inverse of the second set of gain factors may be applied by the control module 30 using a transfer matrix for one or more low-pass filters. In some embodiments, the transfer matrix may be a dynamic gain transfer matrix $$F(s) = \begin{bmatrix} \dfrac{\omega_{d_{filt}}}{\tilde{s} + \omega_{d_{filt}}} & 0 \\ 0 & \dfrac{\omega_{q_{filt}}}{\tilde{s} + \omega_{q_{filt}}} \end{bmatrix}$$

In some embodiments, at least one of the second set of gain factors or the inverse of the second set of gain factors may be applied by the control module 30 using a transfer matrix for one or more lead-lag filters. In some embodiments, the transfer matrix may be a dynamic gain transfer matrix $$F(s) = \begin{bmatrix} \dfrac{\omega_{d_2}}{\omega_{d_1}} \dfrac{(\tilde{s} + \omega_{d_1})}{(\tilde{s} + \omega_{d_2})} & 0 \\ 0 & \dfrac{\omega_{q_2}}{\omega_{q_1}} \dfrac{(\tilde{s} + \omega_{q_1})}{(\tilde{s} + \omega_{q_2})} \end{bmatrix}$$

In some embodiments, at least one of the second set of gain factors or the inverse of the second set of gain factors may be applied by the control module 30 using a transfer matrix for one or more notch filters. In some embodiments, the transfer matrix may be a dynamic gain transfer matrix $$F(s) = \begin{bmatrix} \dfrac{\omega_{d_2}^2}{\omega_{d_1}^2} \dfrac{(\tilde{s}^2 + 2\zeta_{d_1}\omega_{d_1}\tilde{s} + \omega_{d_1}^2)}{(\tilde{s}^2 + 2\zeta_{d_2}\omega_{d_2}\tilde{s} + \omega_{d_2}^2)} & 0 \\ 0 & \dfrac{\omega_{q_2}^2}{\omega_{q_1}^2} \dfrac{(\tilde{s}^2 + 2\zeta_{q_1}\omega_{q_1}\tilde{s} + \omega_{q_1}^2)}{(\tilde{s}^2 + 2\zeta_{q_2}\omega_{q_2}\tilde{s} + \omega_{q_2}^2)} \end{bmatrix}$$

In some embodiments, at least one of the second set of gain factors may be applied by the control module 30 using a transfer matrix for a first type of filter for d-axis values and a second type of filter for q-axis values. In some embodiments, the first set of gain factors may include one or more virtual resistances.

At 730, the method 700 determines the input voltage command for the motor 20 by applying the second set of gain factors to the compensated voltage command to cause the motor 20 to generate the output current with reduced influence of variations of a set of operating parameters of the motor 20.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such. Some implementations are described herein in connection with thresholds.

Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Implementations the systems, algorithms, methods, instructions, etc., described herein can be realized in hardware, software, or any combination thereof. The hardware can include, for example, computers, intellectual property ($I_P$) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term "module" or "sub-module" refers to an ASIC, an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules described herein may be combined and/or further partitioned.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A motor control system that generates an output current from an input voltage command, comprising:
   at least one processor; and
   a memory including instructions that, when executed by the at least one processor, cause the at least one processor to:
      receive, from a motor, the output current that includes a direct-axis (d-axis) portion and a quadrature-axis (q-axis) portion, the output current being received as feedback current;
      determine a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis portion and q-axis portion of the compensated voltage command; and
      determine the input voltage command for the motor by applying the second set of gain factors to the compensated voltage command to cause the motor to generate the output current with reduced influence of variations of a set of operating parameters of the motor.

2. The motor control system of claim 1, wherein the instructions further cause the processor to apply at least one of the second set of gain factors or the inverse of the second set of gain factors using a transfer matrix for one or more low-pass filters.

3. The motor control system of claim 2, wherein the transfer matrix includes a dynamic gain transfer matrix $$F(s) = \begin{bmatrix} \dfrac{\omega_{d_{filt}}}{\tilde{s} + \omega_{d_{filt}}} & 0 \\ 0 & \dfrac{\omega_{q_{filt}}}{\tilde{s} + \omega_{q_{filt}}} \end{bmatrix}.$$

4. The motor control system of claim 1, wherein the instructions further cause the at least one processor to apply at least one of the second set of gain factors or the inverse of the second set of gain factors using a transfer matrix representing one or more lead-lag filters.

5. The motor control system of claim 4, wherein the transfer matrix includes a dynamic gain matrix $$F(s) == \begin{bmatrix} \dfrac{\omega_{d_2}}{\omega_{d_1}} \dfrac{(\tilde{s} + \omega_{d_1})}{(\tilde{s} + \omega_{d_2})} & 0 \\ 0 & \dfrac{\omega_{q_2}}{\omega_{q_1}} \dfrac{(\tilde{s} + \omega_{q_1})}{(\tilde{s} + \omega_{q_2})} \end{bmatrix}.$$

6. The motor control system of claim 1, wherein the instructions further cause the at least one processor to apply at least one of the second set of gain factors or the inverse of the second set of gain factors using a transfer matrix for one or more notch filters.

7. The motor control system of claim 6, wherein the transfer matrix includes a dynamic gain matrix $$F(s) = \begin{bmatrix} \dfrac{\omega_{d_2}^2}{\omega_{d_1}^2} \dfrac{(\tilde{s}^2 + 2\zeta_{d_1}\omega_{d_1}\tilde{s} + \omega_{d_1}^2)}{(\tilde{s}^2 + 2\zeta_{d_2}\omega_{d_2}\tilde{s} + \omega_{d_2}^2)} & 0 \\ 0 & \dfrac{\omega_{q_2}^2}{\omega_{q_1}^2} \dfrac{(\tilde{s}^2 + 2\zeta_{q_1}\omega_{q_1}\tilde{s} + \omega_{q_1}^2)}{(\tilde{s}^2 + 2\zeta_{q_2}\omega_{q_2}\tilde{s} + \omega_{q_2}^2)} \end{bmatrix}.$$

8. The motor control system of claim 1, wherein the first set of gain factors include one or more virtual resistances.

9. A method of controlling a motor that generates an output current from an input voltage command, the method comprising:
   receive, from the motor, the output current that includes a direct-axis (d-axis) portion and a quadrature-axis (q-axis) portion, the output current being received as feedback current;
   determine a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis portion and q-axis portion of the compensated voltage command; and
   determine the input voltage command for the motor by applying the second set of gain factors to the compensated voltage command to cause the motor to generate the output current with reduced influence of variations of a set of operating parameters of the motor.

10. The method of claim 9, wherein at least one of the second set of gain factors are applied using a transfer matrix for a first type of filter for d-axis values and a second type of filter for q-axis values.

11. The method of claim 9, wherein at least one of the second set of gain factors or the inverse of the second set of gain factors are applied using one or more low-pass filters that are part of a dynamic transfer matrix $$F(s) = \begin{bmatrix} \dfrac{\omega_{d_{filt}}}{\tilde{s} + \omega_{d_{filt}}} & 0 \\ 0 & \dfrac{\omega_{q_{filt}}}{\tilde{s} + \omega_{q_{filt}}} \end{bmatrix}.$$

12. The method of claim 9, wherein at least one of the second set of gain factors or the inverse of the second set of gain factors are applied using a transfer matrix for one or more lead-lag filters.

13. The method of claim 12, wherein the transfer matrix is a dynamic gain matrix $$F(s) = \begin{bmatrix} \dfrac{\omega_{d_2}}{\omega_{d_1}} \dfrac{(\tilde{s} + \omega_{d_1})}{(\tilde{s} + \omega_{d_2})} & 0 \\ 0 & \dfrac{\omega_{q_2}}{\omega_{q_1}} \dfrac{(\tilde{s} + \omega_{q_1})}{(\tilde{s} + \omega_{q_2})} \end{bmatrix}.$$

14. The method of claim 9, wherein at least one of the second set of gain factors or the inverse of the second set of gain factors are applied using a transfer matrix for one or more notch filters.

15. The method of claim 14, wherein the transfer matrix is a dynamic gain matrix $$F(s) = \begin{bmatrix} \dfrac{\omega_{d_2}^2}{\omega_{d_1}^2} \dfrac{(\tilde{s}^2 + 2\zeta_{d_1}\omega_{d_1}\tilde{s} + \omega_{d_1}^2)}{(\tilde{s}^2 + 2\zeta_{d_2}\omega_{d_2}\tilde{s} + \omega_{d_2}^2)} & 0 \\ 0 & \dfrac{\omega_{q_2}^2}{\omega_{q_1}^2} \dfrac{(\tilde{s}^2 + 2\zeta_{q_1}\omega_{q_1}\tilde{s} + \omega_{q_1}^2)}{(\tilde{s}^2 + 2\zeta_{q_2}\omega_{q_2}\tilde{s} + \omega_{q_2}^2)} \end{bmatrix}.$$

16. An electronic power steering (EPS) system comprising:
a processor; and
a memory that includes instructions that, when executed by the processor, cause the processor to:
receive, from a motor, output current that includes a direct-axis (d-axis) portion and a quadrature-axis (q-axis) portion, the output current being received as feedback current;
determine a compensated voltage command by applying, to the feedback current, a first set of gain factors and an inverse of a second set of gain factors, the first set of gain factors to decouple a d-axis portion and a q-axis portion of the compensated voltage command, the inverse of the second set of gain factors to allow the compensated voltage command to be filtered in a manner that preserves decoupling between the d-axis and q-axis portions of the compensated voltage command;
receive the compensated voltage command; and
determine input voltage command for the motor by applying the second set of gain factors to the compensated voltage command to cause the motor to generate the output current with reduced influence of variations of a set of operating parameters of the motor.

17. The EPS system of claim 16, wherein determining the compensated voltage command by applying the inverse of the second set of gain factors causes the d-axis portion of the voltage command and the q-axis portion of the voltage command to remain decoupled when provided to the motor.

18. The EPS system of claim 16, wherein the instructions further cause the processor to apply at least one of the second set of gain factors using a transfer matrix for a first type of filter for d-axis values and a second type of filter for q-axis values.

19. The EPS system of claim 18, wherein the transfer matrix includes a dynamic gain matrix $$F(s) = \begin{bmatrix} \dfrac{\omega_{d_{filt}}}{\tilde{s} + \omega_{d_{filt}}} & 0 \\ 0 & \dfrac{\omega_{q_{filt}}}{\tilde{s} + \omega_{q_{filt}}} \end{bmatrix}.$$

20. The EPS system of claim 16, wherein the first set of gain factors include one or more virtual resistances.

\* \* \* \* \*